US006547732B2

(12) United States Patent
Jago

(10) Patent No.: US 6,547,732 B2
(45) Date of Patent: Apr. 15, 2003

(54) ADAPTIVE IMAGE PROCESSING FOR SPATIAL COMPOUNDING

(75) Inventor: James R. Jago, Seattle, WA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 95 days.

(21) Appl. No.: 09/770,604

(22) Filed: Jan. 26, 2001

(65) Prior Publication Data

US 2001/0014773 A1 Aug. 16, 2001

Related U.S. Application Data

(63) Continuation-in-part of application No. 09/335,058, filed on Jun. 17, 1999, now Pat. No. 6,210,328.
(60) Provisional application No. 60/102,923, filed on Oct. 1, 1998.

(51) Int. Cl.[7] .................................................. A61B 8/00
(52) U.S. Cl. ........................ 600/437; 600/443; 600/447
(58) Field of Search ................................. 600/437–472

(56) References Cited

U.S. PATENT DOCUMENTS

| | | | | |
|---|---|---|---|---|
| 4,649,927 A | * | 3/1987 | Fehr et al. ................... | 600/443 |
| 4,751,846 A | | 6/1988 | Dousse | |
| 5,339,815 A | * | 8/1994 | Liu et al. .................... | 600/437 |
| RE35,148 E | * | 1/1996 | Lizzi et al. .................. | 348/163 |
| 5,538,004 A | | 7/1996 | Bamber | |
| 5,566,674 A | | 10/1996 | Weng | |
| 5,575,286 A | | 11/1996 | Weng et al. | |
| 5,655,535 A | | 8/1997 | Friemel et al. | |
| 5,782,766 A | | 7/1998 | Weng et al. | |
| 6,126,598 A | | 10/2000 | Entrekin et al. | |
| 6,210,328 B1 | * | 4/2001 | Robinson et al. ............ | 600/437 |
| 6,283,917 B1 | * | 9/2001 | Jago et al. ................... | 600/437 |

OTHER PUBLICATIONS

S. K. Jespersen, J. E. Wilhjelm, and H. Sillesen, Ultrasound Spatial Compound Scanner for Improved Visualization in Vascular Imaging, IEEE Ultrasonics Symposium 1998, p. 1623–1626.*

Carpenter et al., "A Multimode Real Time Scanner," Ultrasound in Med. & Biol., vol. 6, pp. 279–284, Pergamon Press Ltd., 1980.

Berson et al., "Compound Scanning with an Electrically Steered Beam," Ultrasonic Imaging 3, pp. 303–308, Academic Press, Inc., 1981.

Shattuck et al., "Compound Scanning with a Phased Array," Ultrasonic Imaging 4, pp 93–107, Academic Press, Inc., 1982.

Robinson et al., "Computer Reconstruction Techniques in Compound Scan Pulse–Echo Imaging," Ultrasonic Imaging, pp. 217–234, Academic Press, Inc., 1981.

Wilhjelm et al., "Some Imaging Strategies in Multi–Angle Spatial Compounding," IEEE–UFFC 2000 International Ultrasonics Symposium (Puerto Rico), Oct., 2000.

* cited by examiner

*Primary Examiner*—Francis J. Jaworski
*Assistant Examiner*—William C. Jung
(74) *Attorney, Agent, or Firm*—W. Brinton Yorks, Jr.

(57) ABSTRACT

Spatially compounded images are produced by combining signals from different look directions as a function of the received echo signals. In one embodiment the combinational processing of the echo signals is a function of the steering direction sensitivity of the echo signals. Adaptive variation in the combinational processing can be done on a pixel-by-pixel basis within a particular image, on an image-by-image basis, or in response to the diagnostic exam being performed.

24 Claims, 3 Drawing Sheets

ADAPTIVE IMAGE PROCESSING FOR SPATIAL COMPOUNDING

This is a continuation-in-part of US patent now U.S. Pat. No. 6,210,328, published Apr. 3, 2001 which claims the benefit of provisional U.S. patent application serial No. 60/102,923, filed Oct. 1, 1998.

This invention relates to ultrasonic diagnostic imaging systems and, in particular, to ultrasonic diagnostic imaging systems which produce spatially compounded images that are adaptively processed.

U.S. Pat. No. 6,126,598 and the parent application Ser. No. 09/335,058 describe apparatus and methods for performing real time spatial compounding of ultrasonic diagnostic images. Spatial compounding is an imaging technique in which a number of ultrasound echoes of a given target that have been obtained from multiple look directions or angles are combined into a single compounded image by combining the data at each point in the compound image which has been received from each angle. The compounded image typically shows lower speckle and better specular reflector delineation than conventional ultrasound images from a single viewpoint. These particular patents describe spatial compounding systems that are adaptively variable to change the number of signals from different look directions that are combined as a function of imaging conditions. For example, when the motion of the scanhead is relatively high, the number of look directions used for a given compound image is reduced. When the scanhead is relatively stationary, the number of look directions is increased. In the parent patent application, the number of look directions is increased when imaging at shallow depths, and is decreased when imaging at greater depths.

These adaptive techniques are useful for improving the quality of real time spatially compounded images, as they prevent problems such as image blurring and undesirably low frame rates. It would be desirable to have other adaptive techniques which improve image quality for particular diagnostic applications and imaging targets. For example, a cardiologist looking for plaque buildup on blood vessel walls would want images optimized for discerning vascular structures, whereas an orthopedist looking for muscle and joint injuries would want images optimized for discerning muscle tissue and tendons. Accordingly it would be desirable to be able to optimize the image quality of spatially compounded images for the type of diagnosis being performed, and to be able to do so adaptively.

In accordance with the principles of the present invention, spatial compounding of ultrasonic echoes from different look directions is adaptively varied to vary the manner in which the echo data is combined. In one aspect, the combining process is automatically chosen in response to the selection of a particular diagnostic procedure by the clinician. In another aspect the combining process is dynamically variable in response to a characteristic of the received echo signals, enabling different areas of an image to be selectively combined by different processes. In one embodiment the selection of combining processes is a function of the variation in the echo data with look direction. In another embodiment the selection of combining processes is a function of control signals produced by an image processor. Control signals from an analysis of the echo data may further be used to highlight certain characteristics in the image rather than varying the combining techniques over the image.

Figure 1:
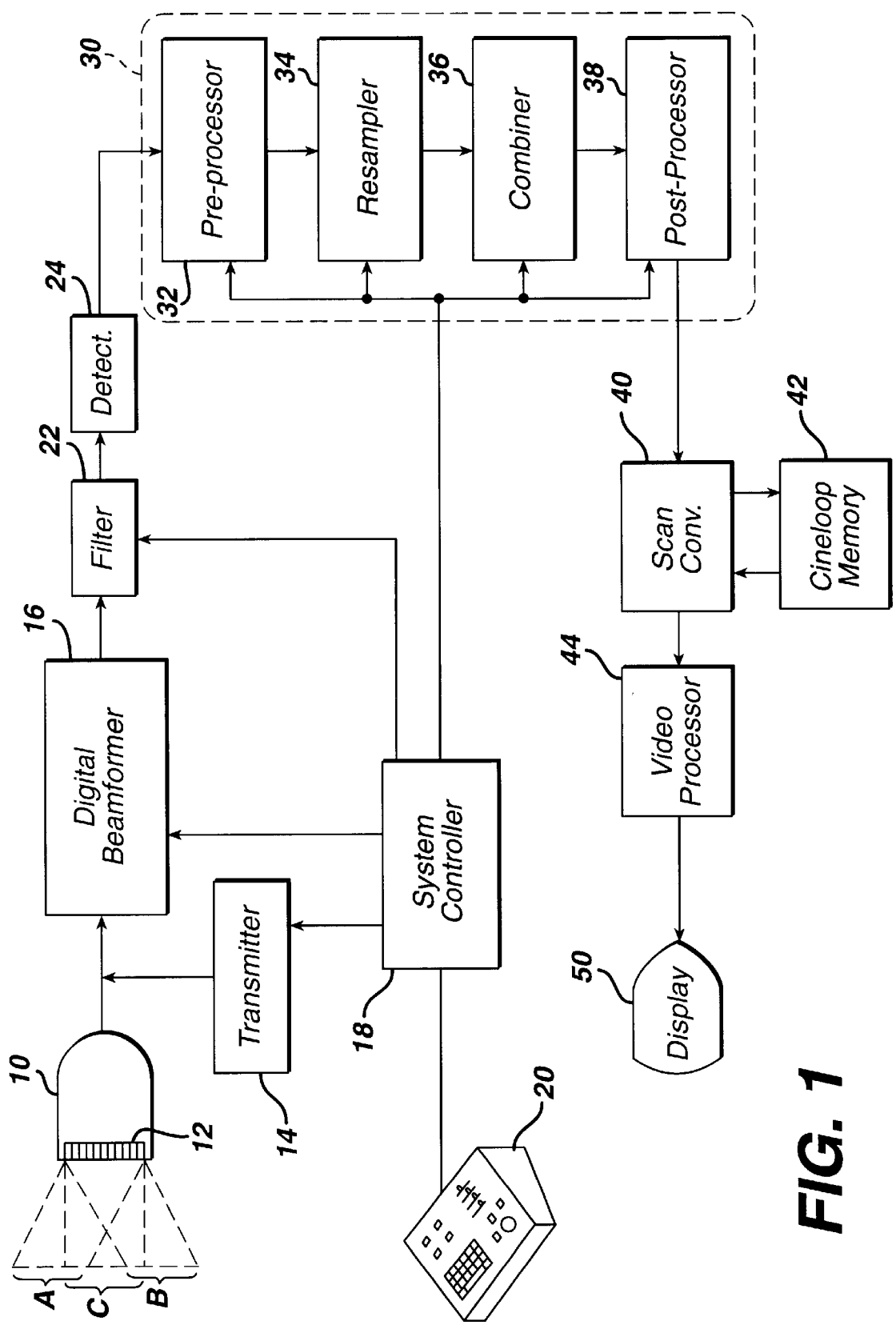
FIG. 1 illustrates in block diagram form an ultrasonic diagnostic imaging system constructed in accordance with the principles of the present invention.

Referring first to FIG. 1, an ultrasonic diagnostic imaging system constructed in accordance with the principles of the present invention is age shown. A scanhead 10 including an array transducer 12 transmits beams at different steering angles over an image field denoted by the dashed rectangle and parallelograms. Three groups of scanlines are indicated in the drawing, labeled A, B, and C with each group being steered at a different angle relative to the scanhead. The transmission of the beams is controlled by a transmitter 14 which controls the phasing and time of actuation of each of the elements of the array transducer so as to transmit each beam from a predetermined origin along the array and at a predetermined steering angle. The echoes returned from along each scanline are received by the elements of the array, digitized by analog to digital conversion, and coupled to a digital beamformer 16. The digital beamformer delays and sums the echoes from the array elements to form a sequence of focused, coherent digital echo samples along each scanline. The transmitter 14 and beamformer 16 are operated under control of a system controller 18, which in turn is responsive to the settings of controls on a user interface 20 operated by the user of the ultrasound system. The system controller controls the transmitter to transmit the desired number of scanline groups at the desired steering angles, transmit energies and frequencies. The system controller also controls the digital beamformer to properly delay and combine the received echo signals for the apertures and image depths used.

The scanline echo signals are filtered by a programmable digital filter 22, which defines the band of frequencies of interest. When imaging harmonic contrast agents or performing tissue harmonic imaging the passband of the filter 22 is set to pass harmonics of the transmit band. The filtered signals are then detected by a detector 24. In a preferred embodiment the filter and detector include multiple filters and detectors so that the received signals may be separated into multiple passbands, individually detected and recombined to reduce image speckle by frequency compounding. For B mode imaging the detector 24 will perform amplitude detection of the echo signal envelope. For Doppler imaging ensembles of echoes are assembled for each point in the image and are Doppler processed to estimate the Doppler shift or Doppler power intensity. The echo signals may undergo other signal and image processing such as harmonic separation or frequency compounding before or after detection.

In accordance with the principles of the present invention the digital echo signals are processed by spatial compounding in a processor 30. The digital echo signals are initially pre-processed by a preprocessor 32. The pre-processor 32 can preweight the signal samples if desired with a weighting factor. The samples can be preweighted with a weighting factor that is a function of the number of component frames used to form a particular compound image. The pre-processor can also weight edge lines that are at the edge of one overlapping image so as to smooth the transitions where the number of samples or images which are compounded changes. The pre-processed signal samples may then undergo a resampling in a resampler 34. The resampler 34 can spatially realign the estimates of one component frame to those of another component frame or to the pixels of the image display space.

After resampling the image frames are compounded by a combiner 36. Combining may comprise summation, averaging, peak detection, or other combinational means as more fully described below. The samples being combined may also be weighted prior to combining in this step of the process. Finally, post-processing is performed by a post-processor 38. The post-processor normalizes the combined values to a display range of values. Post-processing can be most easily implemented by look-up tables and can simultaneously perform compression and mapping of the range of compounded values to a range of values suitable for display of the compounded image.

The compounding process may be performed in estimate data space or in display pixel space. In a preferred embodiment scan conversion is done following the compounding process by a scan converter 40. The compound images may be stored in a Cineloop memory 42 in either estimate or display pixel form. If stored in estimate form the images may be scan converted when replayed from the Cineloop memory for display. The scan converter and Cineloop memory may also be used to render three dimensional presentations of the spatially compounded images as described in U.S. Pat. Nos. 5,485,842 and 5,860,924, or displays of an extended field of view by overlaying successively acquired, partially overlapping images in the lateral dimension. Following scan conversion the spatially compounded images are processed for display by a video processor 44 and displayed on an image display 50.

Figure 2:
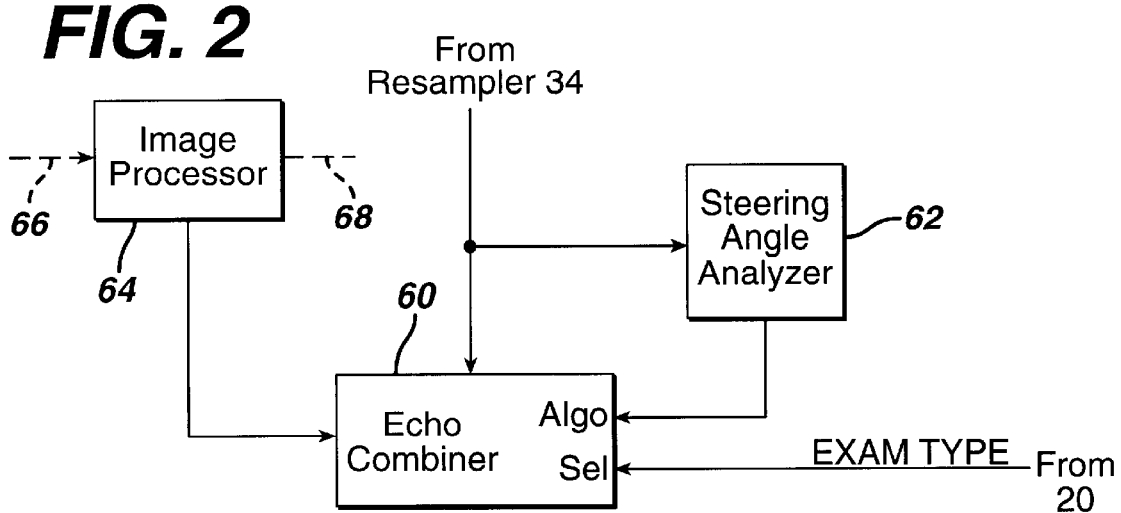
FIG. 2 illustrates in block diagram form further detail of the combiner of FIG. 1.

FIG. 2 illustrates an arrangement of combiner 36 in accordance with the present invention. The echo signals from points in the image region at different steering angles are coupled to a variable echo combiner 60 and to a steering angle analyzer 62. The angle dependency of the echo signals from each point are analyzed by the steering angle analyzer to identify the type of target which generated the echoes. The type of target discerned by the steering angle analyzer is then used to control the algorithm used to combine the echo data for that point or pixel in the compounded image. Thus, the method of combination used for each pixel in the compounded image is a function of the characteristics of the target corresponding to that point in the image region.

Figure 3:
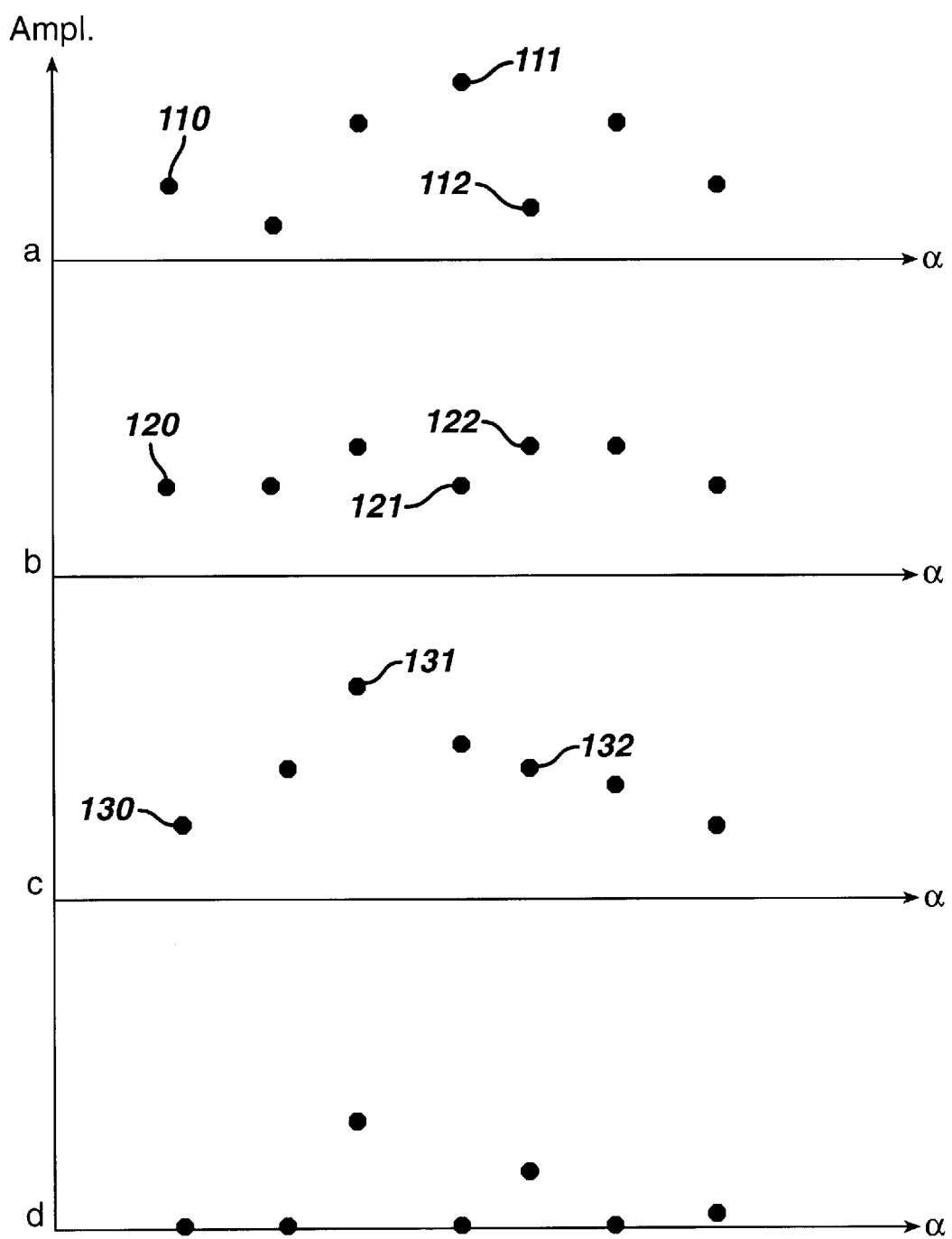
FIGS. 3a–3d illustrate exemplary echo characteristics as a function of steering angle.

Typical dependencies of backscatter amplitude with angle of incidence for various kinds of targets found in ultrasound images are shown in FIG. 3. Each of the four graphs in FIG. 3 plot the backscatter amplitude of seven echoes received from a typical target as a result of insonification at seven different angles of incidence α. For instance, FIG. 3a shows seven echoes 110, 111, 112, etc. which result from coherent speckle. These echoes are seen to be widely distributed in relative amplitude. A variance analysis of the amplitudes of these amplitudes yields a relatively large standard deviation. The analysis used may be complex or it may be a relatively simple approximation. The standard deviation for pure speckle is 1.91, but since the number of samples being analyzed is relatively small, a lesser value could be assigned as a threshold above which the analysis is determined to have identified speckle. For instance, if the random distribution or variance of the echo values has a standard deviation of 1.5 or greater, the steering angle analyzer would determine the point in the image to be a speckle target. Since the speckle of a target is reduced by averaging by the square root of the number of independent steering directions, the echo combiner 60 employs an averaging process to average the echo values 110, 111, 112, etc. Thus, speckle reduction would occur for this pixel in the image region by performance of an averaging of the echo values at this image point.

FIG. 3b illustrates echo values 120, 121, 122, etc. received from a point from multiple steering directions in which the distribution or variance of amplitudes is relatively small. A range of values such as this, where the variation in amplitude is relatively insensitive to steering direction, would typically be received from a point target. A standard deviation threshold such as 0.5 may be assigned to detecting this characteristic, with standard deviations below this threshold being indicative of point targets. The algorithm selected in response to this characteristic may be an averaging or a minimum detection process.

FIG. 3c illustrates a group of steering angle echo values 130, 131, 132, etc. which are seen to be distinctly peaked for a particular insonification direction 131. A distribution of values such as this is characteristic of an anisotropic target such as a specular interface in the body. The steering angles used may result in a distribution which includes the peak value, or may result in a group of values which are trending toward a peak which is outside the range of steering directions used. If sufficient points are acquired to encompass the peak it may be detected by thresholding, or alternatively the characteristic may be identified if a polynomial having a quadratic shape (within a margin of error) can be fit to the echo sample values. The identification of an anisotropic target leads to combinational processing by a peak detection or peak-to-minimum (difference) algorithm by the echo combiner.

Finally, FIG. 3d illustrates a group of values which include a number of values at or near zero. A distribution of echo values such as this are characteristic of noise, and may be detected by setting a threshold Z and determining whether a minimal number W of values are below this threshold. The threshold Z is based upon the dynamic range of the system, with a larger dynamic range exhibiting more noise contamination. The response to detection of a value resulting from noise can be the use of a median or min–max or minimum value of the range by the echo combiner, or simply setting the pixel value at that image location to zero in cases where a large majority of the values are below the noise threshold.

Other combining algorithms may be employed in a particular constructed embodiment of the invention. For example, geometric mean processing and/or r.m.s. processing may be employed if desired.

FIG. 2 illustrates an image processor 64 of the ultrasound system of FIG. 1, which is a part of the signal processing path of the system as indicated by an input 66 and an output 68 to and from the data path of the ultrasound system. The image processor 64 has an additional output which is coupled to the echo combiner 60 to control the type of combinational processing to be performed by the echo combiner. The image processor 64 is representative of any sort of filtering or processing that may be performed on the ultrasound image data, and which may be used to distinguish image characteristics such a specular targets, noise, point targets, speckle, etc. This determination can be used to select the combining method just as described above for the steering angle analyzer, or may be used in combination with the output of the steering angle analyzer to pick the combining method.

In one embodiment of the present invention, the analysis of the image data is performed on a pixel-by-pixel basis, resulting in a selection of the method of combining which is optimized for each pixel in the image. A given compound image may contain image data from anisotropic targets, point targets, noise, and speckle, and a variety of different image-dependent combining processes can be used for different pixels throughout the image.

In another embodiment of the present invention the combining technique for spatial compounding is selected based upon the type of diagnostic exam which is to be performed. For instance if an obstetrical examination of soft tissue or a breast exam is being performed, the subject of the examination is frequently highly attenuative targets. In the obstetrical exam the clinician may be trying to discern soft tissue which is adjacent to strongly reflective bone in a fetus. In the breast exam the clinician may be trying to locate tumors by discerning their acoustic shadowing in the image. Thus, rather than trying to suppress acoustic shadowing, the spatial compounding process is used to enhance this characteristic. In such cases the selection of the examination type by the clinician input from the user interface 20 is used as a control signal to the echo combiner 60 as shown in FIG. 2. The selection of exams of this type, where highly attenuative targets are the subject of the inquiry, may lead to selection of echo combining by a minimum detection process, whereby the echo signal with the minimal value of the different steering directions is used for the pixel value at each point in the image.

As a further example of selection of the combining method by exam type, an obstetrical exam may be conducted to study fetal bone, or a musculoskeletal exam may be conducted to examine tendon injury, or a vascular exam may be conducted to look for plaque on blood vessel walls. In these exams the subjects of the inquiry are anisotropic targets including specular reflectors. In such circumstances the selection of the exam type would lead to use of a peak detection algorithm by the echo combiner, whereby the echo of the different steering directions exhibiting the peak amplitude is used for the pixel value at each point in the image.

As yet a further example the clinician may desire the optimal reduction of image artifacts such as speckle or noise, so that the image is as clean as possible. In these cases the selection by the clinician of this type of optimization would lead to use of an averaging process by the echo combiner at each point in the image.

In another embodiment of the present invention, rather than use the image data to adaptively control the combining process of spatial compounding, the result of the analysis performed is used to designate or highlight a selected feature in the image. For example, suppose that the clinician was examining a tendon for a tear or other injury. Tendons are highly anisotropic, and echoes returned by tendons from beams of different look directions will exhibit a marked steering direction sensitivity such as those shown in FIG. 3c. When a group of echoes with this characteristic is found in an image, that point of the image is highlighted for instance, by setting the pixel to a particular color hue. As an example, pixels with a peak value above a certain threshold may be colored or otherwise highlighted in the image. Alternatively the amount of hue used for the pixel may be chosen to represent the degree of angle dependence (anisotropy) of the point in the image. The combinational processing for the entire image could be set for averaging to reduce the image speckle and noise, for example, and points in the image exhibiting the desired characteristic can be colored with a desired hue. Alternatively, the points in the image with the desired characteristic can be highlighted by using an optimal combining method for the diagnosis such as peak display, while other points in the image are combinationally processed differently such as by averaging to reduce speckle and noise artifacts.

Figure 4:
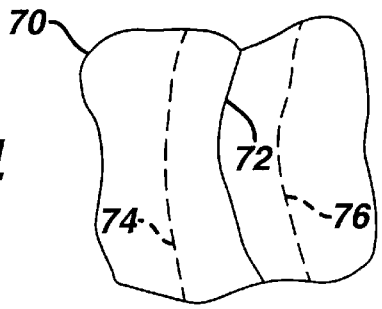
FIG. 4 illustrates a boundary condition artifact which can arise when combinational processing is changed in an image.

The present inventor has found that the use of different combining algorithms for different regions of a spatially compounded image can result in the development of artifacts at a boundary where a transition is made from one type of combining method to another. These artifacts may lead the clinician to diagnose a tissue interface or boundary where none in fact exists. To reduce and potentially eliminate such artifacts, changes in processing methods are made transitionally. For example, FIG. 4 illustrates a region 70 of an ultrasound image where structure to the right of line 72 are processed with one type of combinational processing such as peak detection display. The portion of the image to the left of line 72 are processed by a different combining method such as averaging. This can lead to the development of an apparent boundary in the image at the line 72. To reduce this artifact a transitional combinational process is used on either side of the line 72. For instance, peak detection display may be used in the region to the right of dashed line 76, averaging may be used in the region to the left of dashed line 74, and weighted averaging may be used in the region intermediate the two dashed lines. The changeover in combining methods may be stepwise or continuous. In either case the use of transitional processing reduces the combinational processing artifact. Alternatively, the decision-making process which analyzes the echo data can be intentionally made "fuzzy" (i.e., to have a certain degree of ambiguity) to effect transitional processing results.

Figure 5:
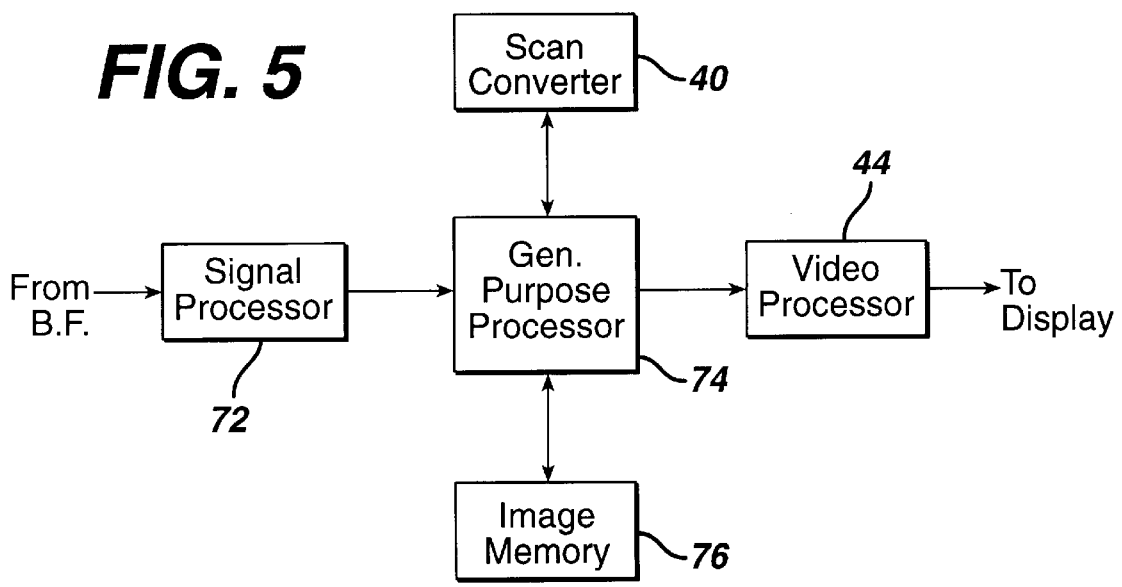
FIG. 5 illustrates in block diagram form a preferred implementation of the spatial compounding processor of FIG. 1.

FIG. 5 illustrates a preferred implementation of the spatial compounding processor 30 of FIG. 1. The processor 30 is preferably implemented by a signal processor 72 which performs conditioning of the echo signals received from the beamformer in FIG. 1. The signal processor 72 performs many of the processes ascribed to the pre-processor 32 above. The echo signals are coupled to a general purpose processor 74, which performs the majority of the processing needed for spatially compounded image display. The processor 74 can resample the echo data, perform the analysis of the echo data needed to determine the combining method, and can perform the combinational processing and post-processing described above. Individual component images used for spatial compounding and fully formed spatially compounded images are stored in an image memory 76. The stored images may be stored in either estimate (R-θ) or display (Cartesian) space notation. Un-scan converted images are coupled to the scan converter 40 which returns scan converted images as needed. The scan converted images are coupled to the video processor 44 for display.

While the present invention can be employed in real time imaging to adaptively combine component images for spatial compounding dependent upon the received echo signals, it will be appreciated that the same techniques can be employed in a post-processing mode of operation. For instance, a stored image can be retrieved and its constituent look direction echoes combinationally reprocessed in various ways until the clinician produces the image which is optimized for a particular diagnosis. An image which was processed by averaging during real time reception and display can be retrieved and the echoes from the different steering directions reprocessed by any of the other combinational methods described above to better display or highlight desired image characteristics or a different type of image characteristic.

What is claimed is:

1. An ultrasonic diagnostic imaging system which receives echo signals from points in an image region from a plurality of different look directions and combines multiple echo signals received from a point to form spatially compounded images comprising:

a receiver which receives echo signals from points in an image region from different steering directions, wherein individual points in the image region return echoes from multiple different look directions;

a processor, responsive to the echo signals received from multiple different look directions from a point in an image, which produces a control signal that is a function of the look direction sensitivity of the echo signals; and an adaptive echo combiner, responsive to echo signals, which combines echo signals from different look directions to produce an image signal value that is a function of the control signal.

2. The ultrasonic diagnostic imaging system of claim 1, wherein the adaptive echo combiner is responsive to the control signal for combining echo signals from different look directions in accordance with a selected one of a plurality of combining algorithms.

3. The ultrasonic diagnostic imaging system of claim 2, wherein the plurality of combining algorithms includes at least two of an averaging process, a minimum detection process, a peak detection process, a median detection process, a peak-to-minimum process, or a zero setting process.

4. An ultrasonic diagnostic imaging system which receives echo signals from points in an image region from a plurality of different look directions and combines multiple echo signals received from a point to form spatially compounded images comprising:

a receiver which receives echo signals from points in an image region from different steering directions, wherein individual points in the image region return echoes from multiple different look directions;

a user interface, responsive to user input, which produces a control signal that is a function of the type of diagnostic exam which the user desires to perform; and an adaptive echo combiner, responsive to echo signals, which combines echo signals from different look directions to produce an image signal value that is a function of the control signal.

5. The ultrasonic diagnostic imaging system of claim 4, wherein the echo combiner is adapted to execute different combining algorithms; and wherein the adaptive echo combiner is responsive to the control signal for combining echo signals from different look directions in accordance with a selected one of a plurality of combining algorithms.

6. The ultrasonic diagnostic imaging system of claim 5, wherein the plurality of combining algorithms includes at least two of an averaging process, a minimum detection process, a peak detection process, a median detection process, a peak-to-minimum process, or a zero setting process.

7. A method for producing ultrasonic spatially compounded images comprising:

receiving echo signals from points in an image region from different steering directions, wherein individual points in the image region return echoes from multiple different look directions;

producing a control signal that is a function of the look direction sensitivity of the echo signals; and adaptively combining echo signals from different look directions to produce an image signal value that is a function of the control signal.

8. The method of claim 7, wherein producing comprises analyzing at least one of the standard deviation, the distribution, the variance, the minimum, the peak, the value fit, or the threshold level of echo signals received from different look directions.

9. (The method of claim 7, wherein adaptively combining echo signals comprises combining echo signals from different look directions in accordance with a selected one of a plurality of combining algorithms.

10. The method of claim 9, wherein adaptively combining echo signals comprises selecting, in response to the control signal, one of the processes of averaging, minimum detecting, peak detecting, median detecting, min–max processing, geometric mean processing, r.m.s. processing, difference detecting, and zero setting.

11. A method for producing ultrasonic spatially compounded images comprising:

receiving echo signals from points in an image region from different steering directions, wherein individual points in the image region return echoes from multiple different look directions;

producing a control signal that is a function of the type of ultrasonic exam to be performed; and adaptively combining echo signals from different look directions to produce an image signal value that is a function of the control signal.

12. The method of claim 11, wherein the ultrasonic exam type comprises one of a breast exam, and obstetric exam, or a musculoskeletal exam.

13. The method of claim 11, further comprising selecting one of a plurality of combining algorithms; and wherein adaptively combining comprises combining echo signals from different look directions in accordance with a selected one of a plurality of combining algorithms.

14. The method of claim 13, wherein adaptively combining comprises selecting, in response to the control signal, one of the processes of averaging, minimum detecting, peak detecting, median detecting, min–max processing, geometric mean processing, r.m.s. processing, difference detecting, or zero setting.

15. A method for producing ultrasonic spatially compounded images comprising:

receiving echo signals from points in an image region from different steering directions, wherein individual points in the image region return echoes from multiple different look directions;

producing a control signal that is a function of at least one of the type of ultrasonic exam to be performed, the image processing of echo signals, and the look direction sensitivity of echo signal; and adaptively combining echo signals from different lock directions in response to the control signal to produce image signal values that are formed by different combining algorithms at different points in an ultrasonic image.

16. The method of claim 15, wherein adaptively combining comprises using a first combining algorithm to produce some of the image signal values of an image, and using a second combining algorithm to produce the rest of the image signal values of the image.

17. The method of claim 16, wherein using the second combining algorithm results in highlighting of a certain signal characteristic of the image.

18. The method of claim 15, wherein comprises selecting a combining algorithm for echo signals returned from a given point on a point-by-point basis.

19. The method of claim 15, wherein adaptively combining comprises utilizing transitional combining algorithms over spatially adjacent points of an image.

20. A method for producing ultrasonic spatially compounded images comprising:

receiving echo signals from points in an image region from different steering directions, wherein individual points in the image region return echoes from multiple different look directions;

adaptively combining echo signals from different look directions to produce an image signal value for each of a plurality of points in the image region;

analyzing echo signals received from different look directions to produce a control signal; and highlighting points in an image in response to the control signal.

21. The method of claim 20, wherein highlighting comprises selectively coloring points in the image.

22. The method of claim 20, wherein highlighting comprises selectively varying the amount of highlighting at points in the image.

23. The method of claim 20, wherein points in an image which are highlighted correspond to image signal values produced by a particular combining algorithm.

24. A method for producing ultrasonic spatially compounded images comprising:

receiving echo signals from points in an image region from different steering directions, wherein individual points in the image region return echoes from multiple different look directions;

analyzing the echo signals received from different points to identify an image characteristic;

adaptively combining echo signals from different look directions by use of a given combining algorithm to produce an image signal value at a point in the image region exhibiting the identified image characteristic; and adaptively combining echo signals from different look directions by use of a different combining algorithm to produce an image signal value at points in the image region which do not exhibit the identified image characteristic.

* * * * *